(12) United States Patent
Roeder

(10) Patent No.: US 6,366,383 B1
(45) Date of Patent: Apr. 2, 2002

(54) RELAY OPTICS FOR A DEFLECTION SYSTEM, AND A DEFLECTION SYSTEM

(75) Inventor: Rolf Roeder, Jena (DE)

(73) Assignee: Carl Zeiss Jena GmbH, Jena (DE)

( * ) Notice: Subject to any disclaimer, the term of this patent is extended or adjusted under 35 U.S.C. 154(b) by 0 days.

(21) Appl. No.: 09/505,746

(22) Filed: Feb. 16, 2000

(30) Foreign Application Priority Data

Feb. 18, 1999 (DE) .......................................... 199 05 874

(51) Int. Cl.[7] .......................... G02B 26/08; G02B 26/12
(52) U.S. Cl. ...................... 359/202; 359/205; 359/208; 359/434
(58) Field of Search ................................ 359/202, 208, 359/205, 216, 434

(56) References Cited

U.S. PATENT DOCUMENTS 4,733,072 A * 3/1988 Lettington ................... 250/235
5,387,996 A * 2/1995 Palombo et al. ............ 359/218

* cited by examiner

Primary Examiner—Jon Henry
(74) Attorney, Agent, or Firm—Reed Smith LLP

(57) ABSTRACT

In relay optics for a deflection system with two scanning devices, each of which changes the angle of a light bundle from a location predetermined separately for each scanning device in a predetermined deflection plane within a predetermined deflection area, an optical system and a mirror surface are provided, wherein the optical axis coincides with respect to position and direction with the central normal of the connecting straight line between the predetermined locations of the first scanning device and second scanning device and the shape and position of the mirror surface are realized in accordance with the conditions that the two vectors, the direction vector of the light bundle and the surface normal of the mirror surface, each projected in the deflection plane of the first scanning device, are identical with respect to direction for every point of incidence of the light bundle on the mirror surface given by the deflection of the first scanning device and that the path of the light bundle running toward the focal surface of the optical system, with the optical axis of the optical system as axis of symmetry, is mirror-symmetric to the path of the light bundle running back from the focal surface.

12 Claims, 5 Drawing Sheets

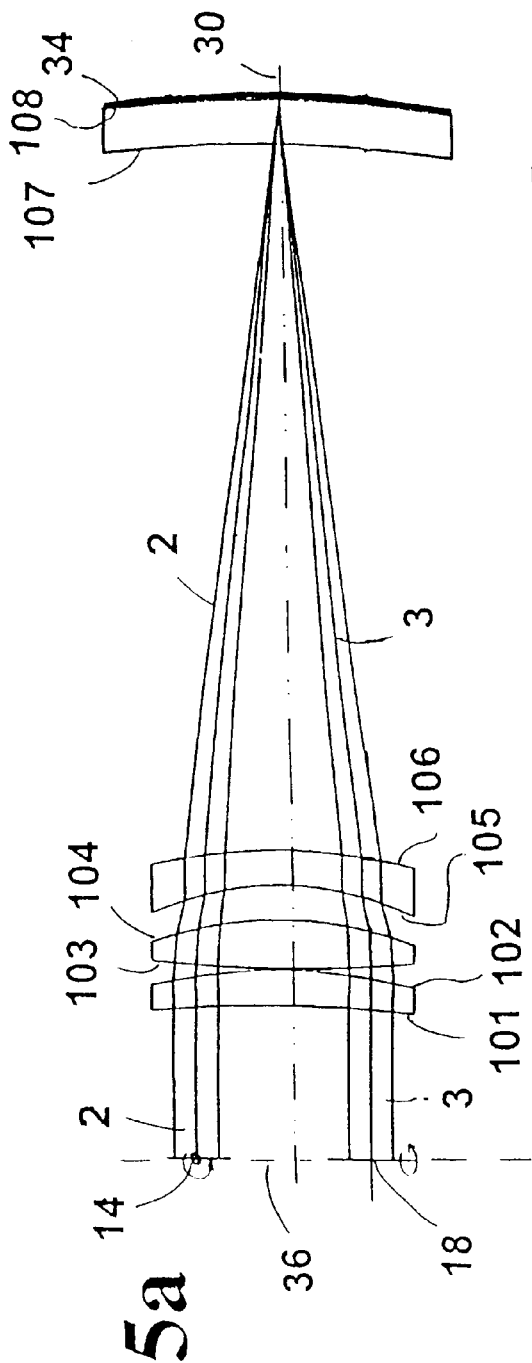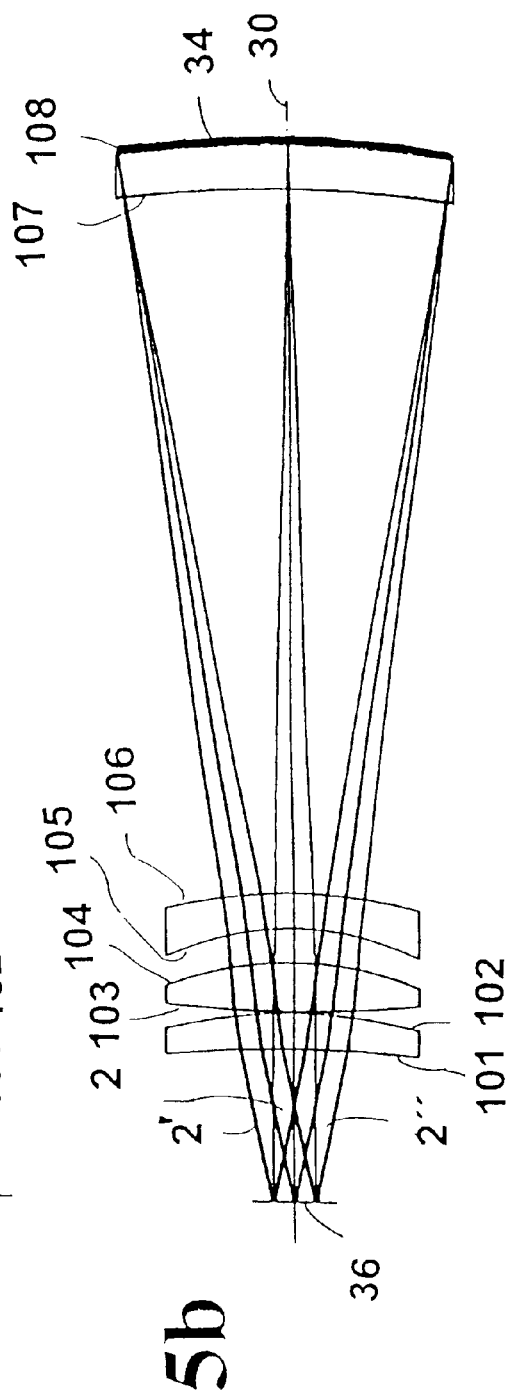

RELAY OPTICS FOR A DEFLECTION SYSTEM, AND A DEFLECTION SYSTEM

BACKGROUND OF THE INVENTION

1. Field of the Invention

The invention is directed to relay optics for a deflection system in which two scanning devices are provided, each of which changes the angle of a light bundle from a location predetermined separately for each scanning device in a predetermined deflection plane within a predetermined deflection area, and the relay optics have a first optical system which focuses a parallel light bundle proceeding from the predetermined location for the first scanning device onto a focal surface and a second optical system which parallelizes the light bundle coming from the focal surface and deflects it to the predetermined location of the second scanning device. Further, the invention is directed to a deflection system in which these types of relay systems can be used.

2. Description of the Related Art

Deflection systems of the type mentioned above are used in laser printing technology as well as in laser video technology. In both of these technologies, a matrix arrangement of picture points is illuminated in a raster by means of a laser light bundle or another intense parallel light bundle in order to present an image. For this purpose, the light bundle is scanned over a surface to be illuminated, for example, on a picture screen, over a plurality of lines in the horizontal direction or line direction, as it is called. Scanning is also effected in the direction perpendicular to the line direction, usually referred to as the vertical direction or image direction, although at reduced speed, so that a right-angled image area is formed by means of the light bundle in time average.

While illuminating different picture points on the surface as a result of: the raster scan, the light bundle is modulated at every moment with a different color and brightness depending on the information content desired for every illuminated picture point. In this way, with suitable modulation, a color image is formed on the surface as is known from conventional television technique which, of course, uses electron beams instead of laser bundles and which first makes the picture visible on a screen as light by means of phosphors.

A laser video system of this type is known, for example, from DE 43 24 849 C2. The deflection is carried out in the line direction by means of a polygon mirror; the vertical scan deflection is carried out by means of a swiveling mirror. However, for the purposes of the set of problems presently under consideration, the type of mirror used for deflection is entirely inconsequential. The exclusive concern of the invention is that a pure angular deflection is carried out in a predetermined plane and that the angle of the angular deflection is carried out during raster scanning with a virtually stationary vertex for the respective deflection angle.

In the case of the video projection described above, these planes for the angular deflection in the line direction and image direction are usually at right angles to one another. However, in the case of oblique projection proceeding from the corner of the image field, geometric distortions occur which can possibly be reduced in part in that an angle more favorable for compensation of distortions than 90° is selected between the plane for line deflection and the plane for image deflection; that is, an arrangement is provided which deviates from the example with planes at right angles.

But the problem statement which will be made more explicit in the following applies for all angles of the deflection planes relative to one another and can be solved by the same principles as those in the conventional arrangement with planes extending at right angles to one another.

When the locations for line deflection and image deflection are distanced from one another, distortion occurs which becomes especially significant when the deflection device is followed by transformation optics for line deflection and image deflection for the purpose of altering and, especially, enlarging the raster-scanned image field. Such transformation optics are described, for example, in DE 43 24 849 C2.

With transformation optics of the kind mentioned above, it has turned out that in the case of planar screens these transformation optics can be suitably corrected for color aberrations and image distortions only on condition that the tangent of the exit angle and the tangent of the incidence angle for the illumination of every picture point are in a fixed ratio or relationship to one another. When the deflection locations for the two deflections are separated, however, the tangent relationship cannot be realized at all because one or the other location is dominant over the course of time; there is no a fixed location given as vertex for the deflection angle.

The above-mentioned tangent relationship relates only to planar picture screens. With spherical projections, for example, in the dome of a planetarium or a partial cylindrical surface such as in many flight simulators, correction is carried out to corresponding relationships of other functions.

The problem resulting from different deflection points is solved according to DE 43 24 849 C2 through compensation by means of complicated optics. These transformation optics could be expected to have a substantially simpler design while avoiding different deflection locations for the two deflections. It is particularly noteworthy in this regard that this problem becomes especially important when choosing to reduce, rather than enlarge, the image, for example when the projection surface is very far from the deflection device. While a reduction of the raster amplitudes could also be considered, the possible picture point number would be drastically reduced in this case because the picture point diameter is substantially determined by the diameter of the laser beam. This reduction in image resolution is not desirable, as a rule.

U.S. Pat. No. 4,297,723 suggests the apparent displacement of the deflection location of one deflection mirror to the other deflection mirror by means of relay optics, so that the angular deflection is then carried out from a point of the deflection location of the final deflection device in the light path.

Relay optics of the type mentioned above can be constructed, e.g., as an afocal lens system, that is, as a lens system comprising two optical systems in which a light bundle terminating at an angle in the focal point of the first system is focused on an intermediate image plane, proceeding from which a second optical system parallelizes the light coming from the intermediate image plane and deflects it into its exit-side focal point. The first scanning device and second scanning device are then arranged in such a way that their deflection locations lie in the object-side focal point of the first optical system and in the image-side focal point of the second optical system.

When the vertex for the deflection angles of one deflection direction in a system of the type mentioned above lies in the entrance-side focal point of the first optical system and the vertex of the deflection angle for the other deflection direction lies in the exit-side focal point of the second system, both angle deflections proceed from the same location, namely, from the exit-side focal point of the second optical system. Therefore, the problems which accordingly result from different deflection locations for the two deflection angles are overcome.

Nevertheless, this solution is poorly suited to practice. Especially in the case of light bundles having a broad wavelength spectrum, color correction with simultaneous correction of other optical aberrations of the first optical system and second optical system is extremely complicated. The complexity is comparable, for example, to that of a non-vignetting telecentric microscope objective of good imaging quality for the entire visible spectrum with object field diameters in the range of 4 to 5 mm and numeric apertures between 0.2 and 0.25. Further, with respect to raster scanning technique, a large distance between the objective and the scanning devices must be taken into account in addition so as to ensure sufficient space for the movement of the deflection mirrors.

OBJECT AND SUMMARY OF THE INVENTION

Therefore, it is the primary object of the invention to provide relay optics for a deflection system of the type mentioned above and a corresponding deflection system, both of which are less complicated than those known from the prior art and which, in particular, also can be optimized with respect to color aberrations in a simple manner.

Based on the prior art mentioned in the beginning, this object is met in that the first optical system as well as the second optical system are formed by one individual optical system and in that a mirror surface is provided which reflects at least once the light bundle traveling from the predetermined location of the first scanning device through the individual optical system which initially acts as a first optical system, the mirror surface then directs this light bundle back to the individual optical system which then acts as a second optical system, wherein the optical axis of the optical system coincides with respect to position and direction with the central normal of the connecting straight line between the predetermined locations of the first scanning device and second scanning device and the shape and position of the mirror surface are realized in accordance with the conditions that the two vectors, the direction vector of the light bundle and the surface normal of the mirror surface, each projected in the deflection plane of the first scanning device, are identical with respect to direction for every point of incidence of the light bundle on the mirror surface given by the deflection of the first scanning device, and that the path of the light bundle running toward the focal surface, with the optical axis of the individual optical system as axis of symmetry, is mirror-symmetric to the path of the light bundle running back from the focal surface.

According to the invention, only one individual optical system is used instead of two optical systems, this individual optical system acting initially as a first optical system and then as a second optical system. The expenditure on relay optics is accordingly reduced by half compared with the relay optics known from the prior art because of the mirror.

Prior to the invention, it would not have been expected at all for this to be possible because, although a mirror at the location of the intermediate image plane in the system described in detail above would have the same effect, the relay optics which are formed in this way would not be usable for cases of orthogonal deflection by means of two scanning devices, since the light bundle, after running back through the first lens system, would then return to the entrance-side focus, that is, to the same location where only one scanning device, but not two scanning devices with different deflection planes, can be arranged. A system of this kind would not be usable at all as relay optics.

It was only the realization that the two deflection locations of the scanning devices can be held at a distance from the optical axis given a suitable design of the mirror surface that allows the relay optics to be constructed with sufficient free space to allow for a suitable arrangement of two different scanning devices.

However, the optional choice of any arrangement of the scanning device with suitable distances from the optical axis does not in itself ensure in terms of optics that one point will be changed into a different point. Only after lengthy consideration did it emerge that sufficiently favorable imaging characteristics are not achieved until the optical axis coincides with respect to position and direction with the central normal of the connecting straight line between the predetermined locations of the first scanning device and second scanning device and the shape and position of the mirror surface are realized in accordance with the conditions that the two vectors, the direction vector of the light bundle and the surface normal of the mirror surface, each projected in the deflection plane of the first scanning device, are identical with respect to direction for every point of incidence of the light bundle on the mirror surface given by the deflection of the first scanning device, and that the path of the light bundle running toward the focal surface, with the optical axis of the individual optical system as axis of symmetry, is mirror-symmetric to the path of the light bundle running back from the focal surface.

This condition will be made clearer with reference to the embodiment examples described hereinafter.

The indicated design for the mirror surface with the additional condition of focusing on a focal surface according to the prior art that is taken into account by the invention determines in an unequivocal manner the characteristics of the mirror surface for every suitable optical system. In particular, it is to be noted that when there is the same focal surface based on the color-corrected individual optical system for all wavelengths, further color-correcting steps are not necessary because, with the symmetric beam path required according to the invention, the light bundle traveling back from the mirror surface practically undergoes the same changes as the light bundle traveling to the focal surface, but with the opposite mathematical sign. This will be explained more clearly with reference to the embodiment examples.

For these reasons, the individual optical system according to the invention can also be provided much more economically compared with the first or second optical system of conventional relay optics. The expenditure for relay optics according to the invention is far less than half of that according to the prior art. Prior to the invention, this result would not have been expected at all from the use of a mirror surface.

However, as has already been made clear in the preceding, the design of the mirror surface is not at all a matter of a special shape; rather, it is a matter of adhering to the criteria indicated above. Expenditure on the individual optical system is particularly small according to a preferred further development of the invention when only one individual reflection is allowed on the mirror surface. In this case, the most favorable mirror surface according to the criteria mentioned above is precisely the focal surface. Therefore, it is only necessary to calculate one individual optical system whose focal surface is the same for all colors. This mirror surface is then simply a result of its shape and position.

Further, the relay optics should have the smallest possible dimensions. In order to achieve this goal, the mirror surface itself can also be used for the individual optical system, according to a preferred further development of the invention, when it is dimensioned in such a way that it reduces the focal length. For this purpose, it is provided according to the advantageous further development of the invention that the focal surface is curved and the center of curvature is located on the same side of the mirror surface as the individual optical system. Because of the curvature, the mirror surface is an additional focusing element in addition to other component elements in the optical system and is suitable for replacing at least one lens in the individual optical system.

An optical system which, as in the invention, in principle only needs to have the characteristic that it focuses can generally be formed of lenses as well as concave or hollow mirrors as will be made clearer hereinafter with reference to embodiment examples.

However, the construction of the individual optical system according to the invention exclusively from lenses is more economical when emphasis is placed on the highest possible parallelism of the emerging light bundle. With requirements such as these, a parabolic mirror can be manufactured with sufficient exactness only with increased expenditure. Therefore, it is suggested according to a preferred further development of the invention that the individual optical system is exclusively a lens system.

The quantity of lenses in the lens system should preferably be less than six and, in particular, less than or equal to four in order to minimize expenditure as far as possible. It will be seen that this is possible when it is considered that, apart from its focusing characteristic, the individual optical system otherwise requires essentially only color correction so that the same focal surface is formed for all light components of different wavelength of the light bundle. Prior to the invention, however, it could not be expected at all from the known relay optics that it would be possible to make do with such a small quantity of lenses.

Moreover, expenditure can be reduced even further when the mirror surface is not formed as a separate mirror but, rather, according to a preferred further development of the invention, is provided as a mirror surface on the final lens in the individual optical system. This can be achieved by simple evaporation coating, for example, with silver or aluminum, or by other types of coating of the side of the lens facing away from the entrance side. However, the features according to the invention are achieved only when the characteristic that the mirror surface is also the final lens surface is taken into account in the design of the rest of the lenses of the optical system to satisfy the conditions mentioned above.

Another essential concern for practical use of relay optics in imaging techniques is a construction size that is as small as possible. This construction size can be minimized in that the mirror surface, together with the lens, is constructed so as to be self-focusing and therefore distance-reducing. In this regard, it is provided according to two advantageous further developments of the invention that, first, the radii of curvature of the mirror-coated lens are different on both sides and, second, in particular, the radius of curvature of the mirror-coated side is less than that of the opposite side.

In a deflection system according to the invention, the relay optics described above are provided with the two scanning devices and these three construction elements are adapted to one another with respect to their arrangement and specifications.

In particular, it is provided according to an advantageous further development of the deflection system according to the invention that the two scanning devices are designed for different magnitudes of angular ranges of their respective deflection angles and that the scanning device with the largest angular range is arranged, in the direction of light propagation, in front of the relay optics as first scanning device and the other scanning device is arranged following the relay optics as second scanning device. Thus, compared with the opposite arrangement of the two scanning devices, a reduced thermal loading of the mirror is achieved; excessive pointwise thermal loading can cause the mirror to distort in operation. This can even reduce its working life.

Thermal loading of the mirror may not be disregarded with respect to design especially when laser beams are used as light bundles, as is conventional, for example, in video projection, and this is particularly true when the mirror surface is located in the focal surface. A reduction in thermal loading per unit surface area further reduces expenditure for possible mirror cooling as well as the thickness of the mirror surface.

As was already stated above, it is very important in practice that a deflection device can be dimensioned as small as possible. Small mirrors allow substantially higher deflecting speeds than larger mirrors, e.g., because of the reduced inertia. The high speeds in small mirrors or small swing amplitudes are of special interest for video technique. Based on these considerations, the smallest possible deflection angles will be wanted at the limit of the desired resolution capability. In order to change the size of the video image which can then be achieved, it is provided according to a further development of the invention that, in the direction of light propagation, transformation optics are arranged behind the two scanning devices and the relay optics located therebetween, in which transformation optics the quotient between the tangent of the exit angle and the tangent of the incident angle is a constant.

The constant tangent ratio mentioned herein has turned out to be particularly favorable for design because transformation optics of this kind can be designed with low chromatic aberrations and low distortion in planar picture screens.

However, the known transformation optics can be dimensioned in a substantially simpler manner in connection with the above-mentioned relay optics and are therefore less complicated than those known from the prior art, since it is no longer necessary to take into account different locations for the two deflections with the use of the relay optics according to the invention.

Further details of the invention are also given in the following description of embodiment examples with reference to the accompanying drawing.

BRIEF DESCRIPTION OF THE DRAWINGS

In the drawings:

FIG. 3 shows another embodiment example with two reflections at the mirror surface in a view similar to that in FIG. 2a;

FIG. 5 shows another embodiment example in which a curved focal surface is realized by means of a lens system, wherein the views in FIGS. 5a and 5b are selected in accordance with the views in FIGS. 2a and 2b.

DESCRIPTION OF THE PREFERRED EMBODIMENTS

The following description will not address the details of an imaging system, whether in printing technology or in video technology. However, the fundamental principles of deflection will be described more fully for the sake of a better understanding of the invention.

The fundamental principles of deflection essentially do not depend on whether the light bundle to be deflected is monochromatic, as with an individual laser beam, or whether it is composed of, usually, three laser beams with the colors red, green and blue as in color video technology. Nevertheless, possible steps for color correction will also be indicated explicitly in the following.

Figure 1:
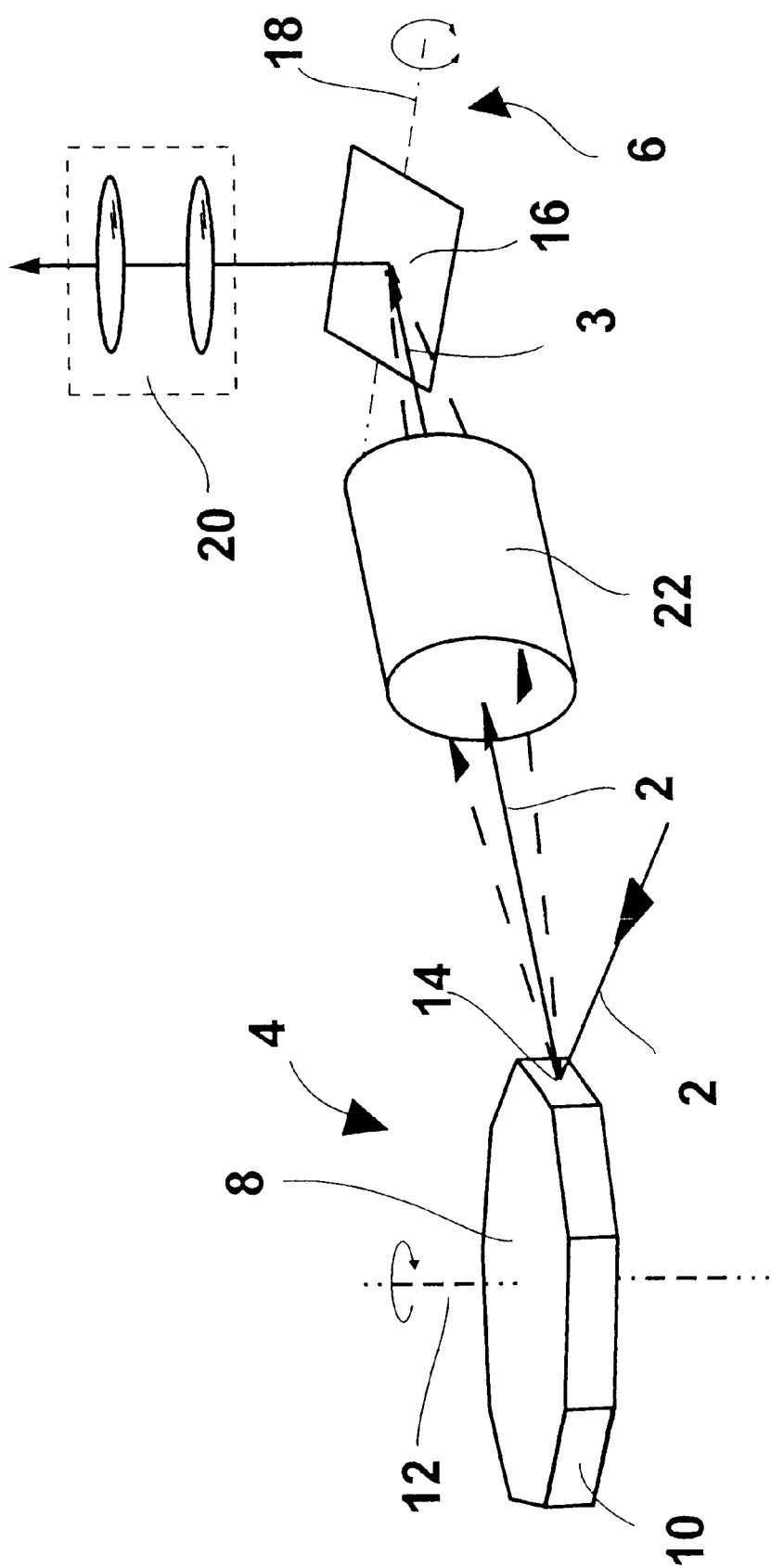
FIG. 1 shows a deflection system for two orthogonal angular deflections with relay optics to illustrate the principles applied in the invention.

A deflection system of the type mentioned above, such as is used in laser video technology, for example, is described in principle in FIG. 1. In video technology, a fast line deflection and, vertical thereto, a slower image deflection, are carried out, so that a rectangular raster of picture points is illuminated in a manner similar to television tubes, although, of course, electron beams are used in the latter. As in the Braun tube, in which the electron beam is intensity-modulated, the light bundle 2 used in laser video technology is modulated with respect to color and brightness of the respective illuminated picture point and is then deflected in two dimensions via two scanning devices 4 and 6 before arriving on a picture screen on which the video image is then observable. The time average required because of the individual picture points derives from the inertia of the observer's eye, so that the entire image can be viewed. It will be seen from this that very rapid deflections are required for conventional television standards.

In the embodiment example according to FIG. 1, the first scanning device 4 is a polygon mirror 8, that is, a polygon-shaped rotating body with a plurality of mirrored facets 10 at its circumference which rotates quickly about its axis of rotation 12. Because of the large number of facets 10 and the high possible rates of rotation, there are sufficiently high deflection speeds for the angular deflections caused by the reflecting facets for the line deflection of a video picture.

However, it is of chief importance in this respect that the deflection of the light bundle 2 caused by the first scanning device can be presented essentially as a pure angular deflection proceeding from a location 14.

The second scanning device 6 has the same characteristic. A tilting mirror 16 which is swiveled back and forth about an axis 18 for carrying out the image deflection is used for this second scanning device 6. When the light bundle deflected by the scanning device 4 falls on this axis 18, it determines the vertex for the respective angular deflection of this second scanning device 6.

For the purpose of expansion, the image field scanned by the two scanning devices 4 and 6 is subsequently enlarged by means of transformation optics 20. These transformation optics 20 comprise an essentially a focal lens system which is corrected for the tangent condition, i.e., the ratio of the tangent of the exit angle to the tangent of the incident angle is a constant.

Transformation optics of the type mentioned above can only be provided in an economical manner when the location of the angular deflection 14 and the other location given by the axis 18 have a very small distance between them or, in the ideal case, are even located one above the other. In order to create this initial condition for the transformation optics 20, relay optics 22 such as those described in the introductory part can be used, these relay optics 22 changing the direction and location of the light bundle 2 after being deflected by the scanning device 4 in the same way as would be carried out if it were effected proceeding from the deflection point of the scanning device 6. This effect of the relay optics is indicated schematically by dashed lines in FIG. 1.

The construction according to FIG. 1 shows an arrangement according to the prior art in which the same optical axis as the axis of symmetry is provided for the light bundles entering and exiting the relay optics. On the other hand, for the relay optics according to the invention, embodiment examples according to FIGS. 2 to 5 are suggested, in which the incident light bundle 2 and the exiting light bundle 3 do not lie on the same axis. Further, the two scanning devices in the relay optics which are shown in detail herein lie on the same side of the relay optics 22, while they are arranged on both sides of the latter in FIG. 1.

The optical axis shown in FIGS. 2 to 5 is still designated by reference number 30. The individual optical system which was already mentioned is again designated by reference number 32, while the mirror surface which is novel in relation to the prior art is provided throughout with reference number 34. The deflection locations 14 and 18 are located in all embodiment examples on a connecting straight line 36 whose central normal is the optical axis 30 of the optical system 32.

Figure 2:
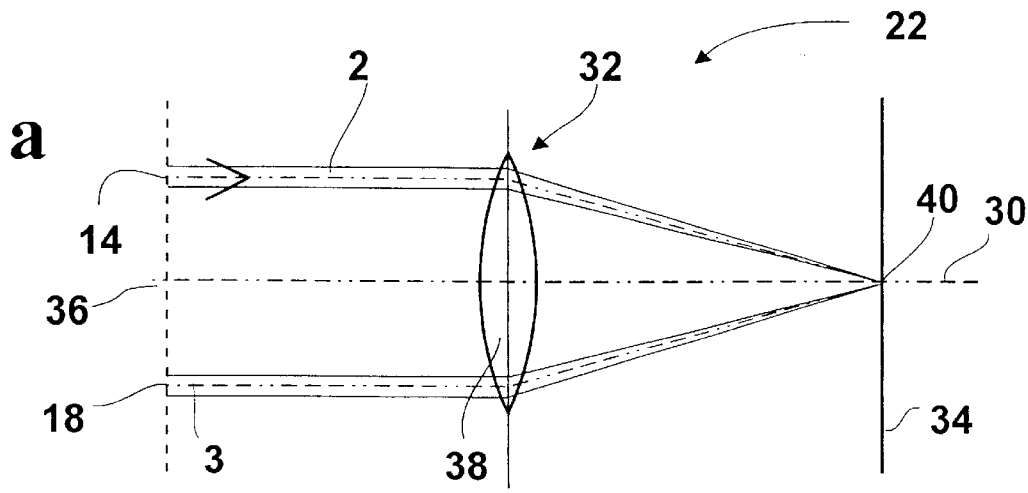
FIG. 2 schematically shows the embodiment example for relay optics in two views, a and b, for the two planes of the two angular deflections.
Figure 2:
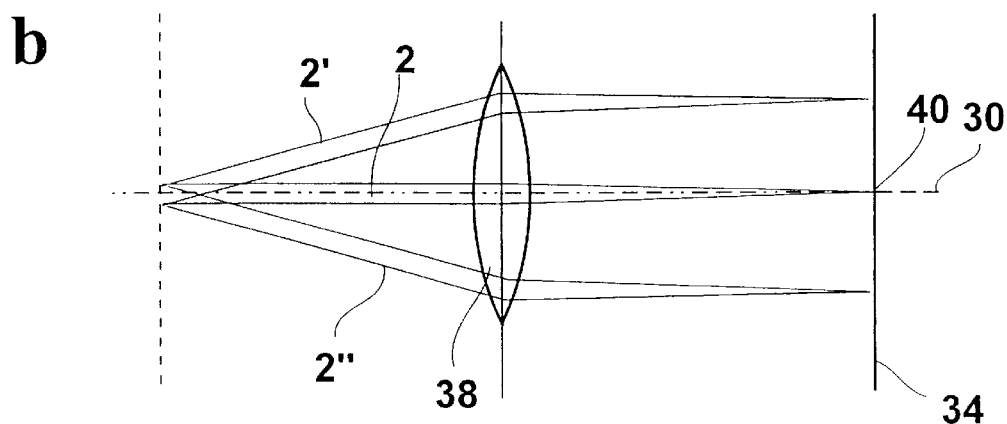

The optical system 32 is illustrated schematically in FIG. 2 by an individual lens 38 which could also be a multiple-lens optical system in practice, above all when an apochromat is used for color correction in order to provide the same focal points for all color components of the light bundle 2. In the embodiment example in FIG. 2, the mirror surface 34 is formed by a plane mirror whose surface normal faces in the direction of the optical axis 30.

For purposes of illustrating the manner of operation, the embodiment example according to FIG. 2 is shown in two views, a and b. FIG. 2a shows a projection on a plane extending at right angles to the plane of the angular deflection of the first scanning device 4, while FIG. 2b shows a projection on the plane of the angular deflection schematically.

The connecting straight line 36 between the locations lies in the object-side focal plane of the optical system 32, while the mirror surface 34 lies in its image-side focal plane. As a result of this position of the mirror surface 34, the light bundle proceeding from location 18, for all of the deflection angles in the projection of FIG. 2a, is focused on an individual point 40 from which it travels back at an opposing angle. It is then parallelized again by the optical system 32 and then deflected again as a parallel light bundle in location 18 onto the focal plane from which it is raster-scanned by the second deflection device 6. Because of the distance between the locations 14 and 18 which was made possible by the provided symmetry, there is sufficient space for the arrangement of two scanning devices, as can be clearly seen from FIG. 2a.

Point 40, however, is a geometric point only in this projection, as follows primarily from the projection of the relay optics according to FIG. 2b. In this case, three different light bundles 2, 2' and 2" with different deflection angles are illustrated schematically. All three light bundles 2, 2', 2" have in common that they are focused on the mirror surface 34 as was already clear from FIG. 2a. But in this projection, they strike different locations of the mirror surface 34. However, since the direction of the surface normal of the mirror surface 34 in this projection is the same as the direction of incidence of the focused light bundle, the light bundles according to FIG. 2b, projected in the above-mentioned plane, are reflected back on the same path by which they arrived at the mirror surface 34 and, after traveling back, have the same angle, although in the light propagation direction opposite to that of the incident light bundles 2, 2' and 2". However, after the light bundle passes through the relay optics 22, the apparent location of the deflection lies vertical to this projection plane, as can be seen from FIG. 2a, at a distance from the actual location 14 of the first scanning device 4 to the location 18 of the second scanning device 6.

The embodiment example thus meets all of the requirements for use in a deflection system according to FIG. 1. However, as was made clear, one individual lens 38 is adequate in principle.

When compensating for color aberrations, a chromatically corrected lens system is used, so that the essential condition of the position of the focus for all wavelengths is met in the embodiment example.

Figure 3:
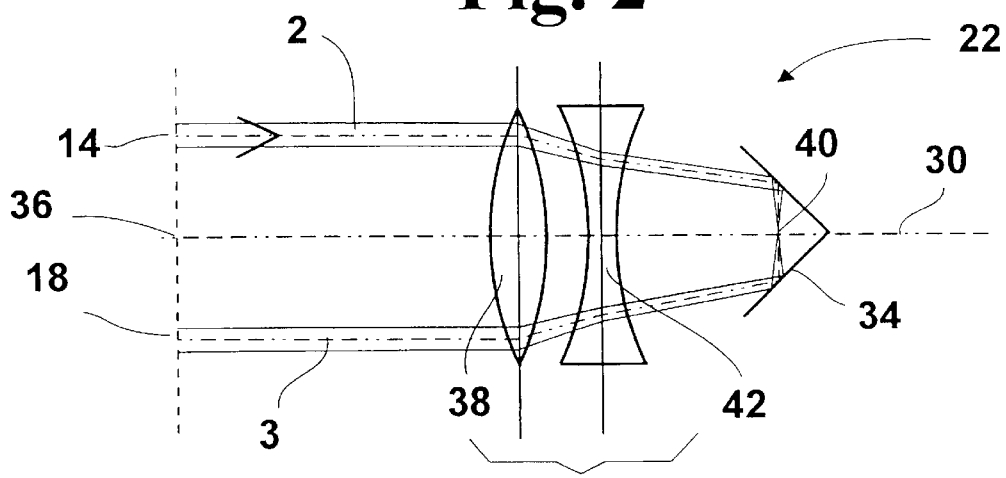

FIG. 3 shows schematically an embodiment example in the same projection as that in FIG. 2a in which the focus does not lie on the mirror surface 34, in contrast to the embodiment example in FIG. 2.

In order to better illustrate the relationships, the same ratios are selected as those determined on the basis of lens 38; but another lens 42 is shown, by means of which the image-side focal point of the optical system 32 is situated at greater distances.

In the view shown in FIG. 3 corresponding to FIG. 2a, the mirror surface 34 is realized with two plane mirrors arranged at 45° relative to the optical axis 30. However, because of the lens 42 and the angled mirror, the light bundle in this embodiment example is reflected twice. The focal point likewise lies on the optical axis 30, but at a distance from the mirror surface 34, which is especially beneficial as regards a low thermal loading of the mirror surface 34.

For understanding the ratios vertical to the plane shown in FIG. 3, the person skilled in the art is referred to FIG. 2b with the accompanying description because the same imaging principles are applied therein.

Figure 4:
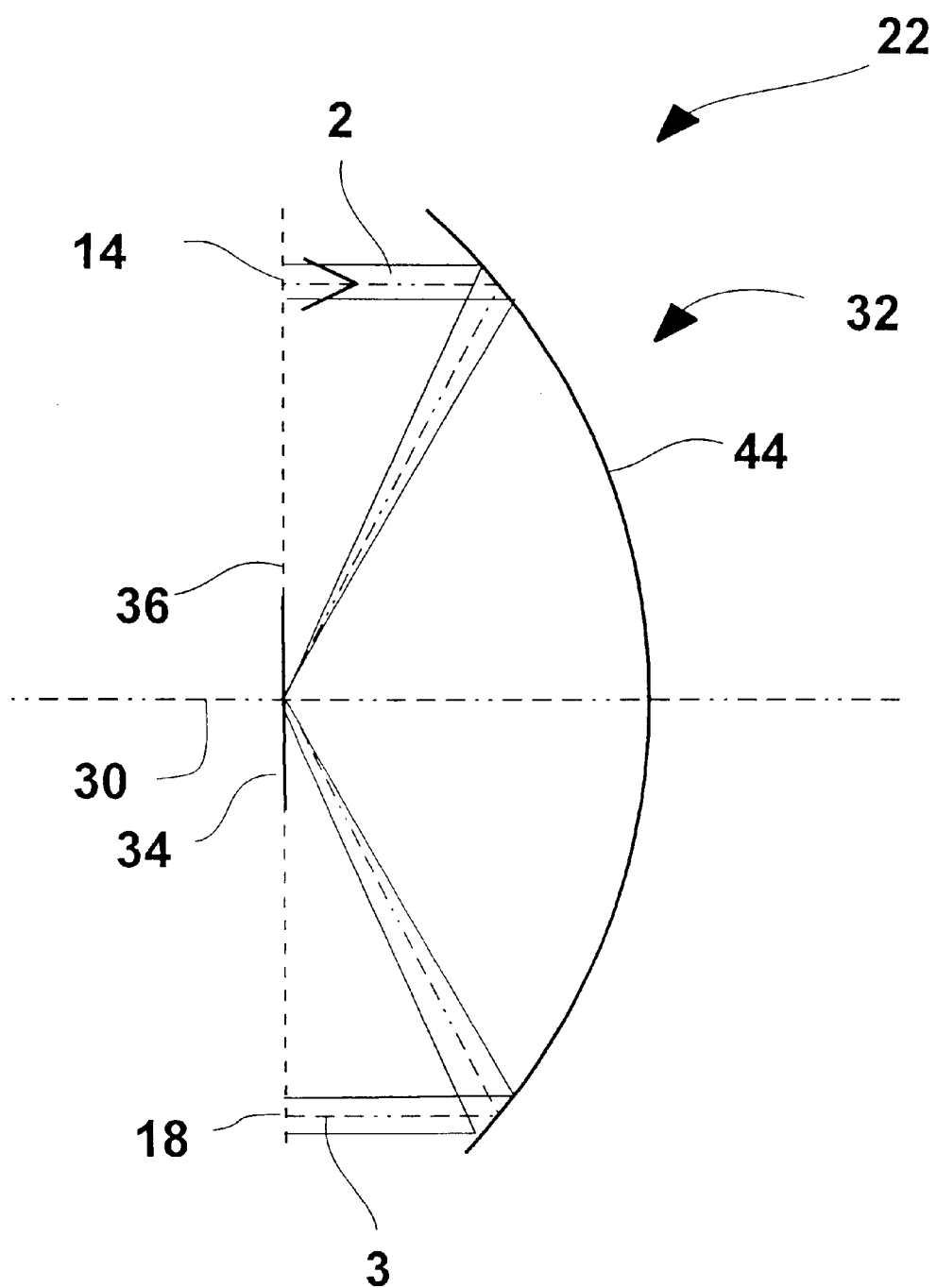
FIG. 4 shows another embodiment example in a view similar to FIG. 2a with a parabolic mirror as individual optical system in addition to the mirror surface.

In the embodiment example of FIG. 4, a parabolic mirror 44 is provided instead of the lens 38 of the embodiment example in FIG. 2. The mirror surface 34 is again formed by a plane mirror 3, although the latter has smaller dimensions in the plane shown in FIG. 3 than the length of the connecting straight line 36 in order to maintain a clear path to the mirror surface 34 for the light bundles 2 and 3.

The manner in which a lens is replaced by a parabolic mirror is well known to the person skilled in the art, so that this embodiment example requires no further explanation. In particular, FIG. 4 is referred to explicitly for better comprehension. It will be seen from this Figure that the locations 14 and 18, and accordingly the scanning devices 4 and 6 for this embodiment example, lie in the same focal plane as the mirror surface 34.

Also, in particular, no dispersion occurs in relay optics 22 of the type mentioned above because exclusively mirror surfaces are provided. For this reason, all steps for color correction are obviated.

FIG. 5 shows another embodiment example which was calculated particularly in all details. The lens data are indicated in the accompanying table in which the respective lens surface or mirror surface characterized in FIG. 5 is designated as shown in the "reference number" column. The next column shows the respective radii of curvature for these surfaces in millimeters.

The subsequent part of the table contains physical values for the area between the surfaces. In the first column of this part, the respective spacing between adjacent surfaces on the optical axis 30 is indicated in millimeters. The following three columns indicate the index of refraction for wavelengths 532 nm, 447 nm and 635 nm. In the middle of these columns, "air" is indicated, which refers to an air space, that is, the indices of refraction for these intermediate spaces in the indicated wavelengths have the value of approximately one.

The three indicated wavelengths were selected because the shown optics were calculated for a laser projection device operating with three laser beams of these wavelengths that are combined in an individual laser bundle.

As can also be seen from the table, the mirror surface 34 has a distance of zero from the lens surface 108 and has the same radius of curvature. This means that the mirror surface 34 can be evaporated on or deposited on the final lens surface. Silver and aluminum are suitable for this purpose, for example.

Figure 5C:
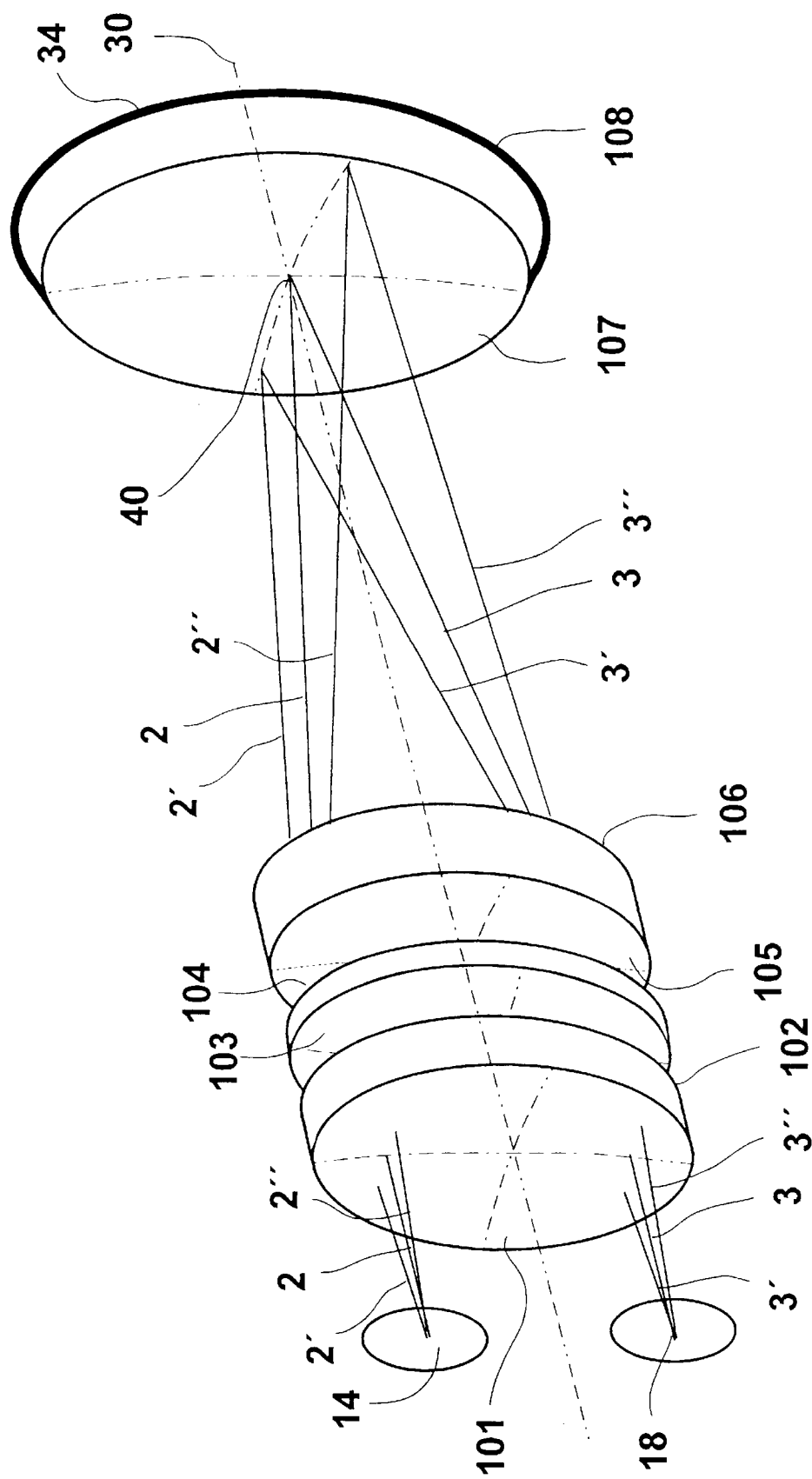
FIG. 5c shows a perspective view.

FIGS. 5a and 5b show the same projections as those already described in detail with reference to FIGS. 2a and 2b. FIG. 5c once again explicitly shows a three-dimensional view which more clearly illustrates the beam path of the light bundles 2 and 3 in space. In particular, this embodiment example was calculated for the condition that the final surface of the lens system is formed as a mirror surface 34, that is, it is also the focal surface.

The relay optics shown as embodiment examples demonstrate the variety of ways in which the invention can be arranged. The symmetry, shown clearly in FIGS. 2 to 5, with respect to the optical axis for the light bundles 2 and 3 traveling back and forth and the same directions of the normals of the respective mirror surface 34 and the direction of the incidence of the light bundle 2 are important with respect to the depicted manner of operation. As a result of this sameness, the reflected light bundle considered in the projection shown travels back along the same path and is incident at the second location at the same angle by which it runs into the relay optics 22 at the first location 22.

While the foregoing description and drawings represent the present invention, it will be obvious to those skilled in the art that various changes may be made therein without departing from the true spirit and scope of the present invention.

TABLE

| SURFACE | | | BETWEEN SURFACES | | |
| --- | --- | --- | --- | --- | --- |
| Reference number | Radius [mm] | Distance [mm] | Index of refraction [532 nm] | Index of refraction [447 nm] | Index of refraction [635 nm] |
| 36 | ∞ | | | | |
| 101 | −165.2 | 17.5 | | air | |
| 102 | −62.3 | 4.0 | 1.519 | 1.525 | 1.515 |
| 103 | 146.6 | 0.2 | | air | |
| 104 | −42.6 | 5.5 | 1.435 | 1.438 | 1.432 |
| 105 | −34.6 | 4.0 | | air | |
| 106 | −61.7 | 4.0 | 1.654 | 1.669 | 1.643 |
| 107 | −155.5 | 80.5 | | air | |

TABLE-continued

| SURFACE | | | BETWEEN SURFACES | | |
|---|---|---|---|---|---|
| Reference number | Radius [mm] | Distance [mm] | Index of refraction [532 nm] | Index of refraction [447 nm] | Index of refraction [635 nm] |
| 108 | −132.8 | 5.0 | 1.460 | 1.465 | 1.456 |
| 34 | −132.8 | 0 | | air | |

What is claimed is:

1. Relay optics for a deflection system in which two scanning devices are provided, each of which changes the angle of a light bundle from a location predetermined separately for each scanning device in a predetermined deflection plane within a predetermined deflection area, said relay optics comprising:

a first optical system which focuses a parallel light bundle proceeding from the predetermined location for the first scanning device onto a focal surface; and a second optical system which parallelizes the light bundle coming from said focal surface and deflects it to the predetermined location of the second scanning device;

said first optical system as well as the second optical system being formed by one individual optical system;

a mirror surface being provided which directs at least once the light bundle traveling from the predetermined location of the first scanning device through said individual optical system which initially acts as a first optical system, said mirror surface then directing said light bundle back to said individual optical system which then acts as a second optical system;

said individual optical system having an optical axis which coincides with respect to position and direction with the central normal of a connecting straight line between the predetermined locations of the first scanning device and second scanning device;

the shape and position of the mirror surface being realized in accordance with conditions that two vectors, the direction vector of the light bundle and the surface normal of the mirror surface, each projected in the deflection plane of the first scanning device, are identical with respect to direction for every point of incidence of the light bundle on the mirror surface given by the deflection of the first scanning device; the path of the light bundle running toward the focal surface, with the optical axis of the individual optical system as axis of symmetry, being mirror-symmetric to the path of the light bundle running back from said focal surface.

2. Relay optics according to claim 1, wherein, on its path from the individual optical system and back to the optical surface, the light bundle is reflected only once and the mirror surface is the same as the focal surface in position and shape.

3. Relay optics according to claim 2, wherein the focal surface is curved and the center of curvature is located on the same side of the mirror surface as the individual optical system.

4. Relay optics according to claim 1, wherein the individual optical system is a lens system.

5. Relay optics according to claim 4, wherein the quantity of lenses in the lens system is less than or equal to six.

6. Relay optics according to claim 4, wherein the quantity of lenses in the lens system is less than or equal to four.

7. Relay optics according to claim 1, wherein a lens is mirror-coated on one side and whose mirror coating is the mirror surface.

8. Relay optics according to claim 7, wherein the radii of curvature of the mirror-coated lens are different on both sides.

9. Relay optics according to claim 7, wherein the radius of curvature of the mirror-coated lens on the mirror-coated side is less than that on the opposite side.

10. A deflection system with relay optics according to claim 1, comprising a first and second scanning device whose deflection planes and arrangements with respect to the respective location are adapted to the construction of the relay optics.

11. A deflection system according to claim 10, wherein the two scanning devices are designed for different magnitudes of angular ranges of their respective deflection angles and in that the scanning device with the largest angular range is arranged, in the direction of light propagation, in front of the relay optics as first scanning device and the other scanning device is arranged following the relay optics as second scanning device.

12. The deflection system according to claim 10, wherein, in the direction of light propagation, transformation optics are arranged behind the two scanning devices and the relay optics located therebetween, in which transformation optics the quotient between the tangent of the exit angle and the tangent of the incident angle is a constant.

* * * * *